United States Patent [19]

Fong et al.

[11] Patent Number: 4,604,431

[45] Date of Patent: Aug. 5, 1986

[54] CHEMICAL MODIFICATION OF (METH)ACRYLIC ACID HOMOPOLYMERS AND ALKYL (METH)ACRYLATE POLYMERS IN AQUEOUS SYSTEMS WITH AMINO SULFONIC ACIDS

[75] Inventors: Dodd W. Fong; Claudia C. Pierce, both of Naperville; David A. Grattan, Lagrange Highlands, all of Ill.

[73] Assignee: Nalco Chemical Company, Oak Brook, Ill.

[21] Appl. No.: 800,833

[22] Filed: Nov. 22, 1985

[51] Int. Cl.$^4$ ............................................. C08F 8/36
[52] U.S. Cl. .................................. 525/351; 525/329.8
[58] Field of Search ......................................... 525/351

[56] References Cited

U.S. PATENT DOCUMENTS

| | | | |
|---|---|---|---|
| 3,230,201 | 1/1966 | Hart et al. | 525/351 |
| 3,312,672 | 4/1967 | Ayad | 525/351 |
| 3,506,707 | 4/1970 | Miller et al. | 260/513 |
| 3,692,673 | 9/1972 | Hoke | 210/52 |
| 3,806,367 | 3/1974 | Lange et al. | 134/3 |
| 3,898,037 | 8/1975 | Lange et al. | 134/3 |
| 4,139,684 | 3/1979 | Coupek et al. | 525/351 |
| 4,284,517 | 8/1981 | Chen et al. | 525/351 |
| 4,317,893 | 3/1982 | Chen et al. | 525/351 |

*Primary Examiner*—Joseph L. Schofer
*Assistant Examiner*—Bernard Lipman
*Attorney, Agent, or Firm*—John G. Premo; Donald G. Epple; Robert A. Miller

[57] ABSTRACT

The invention comprises a method of preparing copolymers of acrylamido sulfonic acids which comprises converting to acrylamido sulfonic groups at least 5 mole % of the acrylic acid or methacrylic acid groups in a polymer which contains at least 5 mole % of these monomers in its structures by reacting an aqueous solution of the acrylic acid or methacrylic acid polymer with an amino sulfonic acid under pressure at a temperature of at least 70° C. for a period of time sufficient to convert at least 5 mole % of the acrylic acid or methacrylic acid groups in the polymer to amido sulfonic acid groups corresponding to the starting amino sulfonic acid.

5 Claims, No Drawings

CHEMICAL MODIFICATION OF (METH)ACRYLIC ACID HOMOPOLYMERS AND ALKYL (METH)ACRYLATE POLYMERS IN AQUEOUS SYSTEMS WITH AMINO SULFONIC ACIDS

INTRODUCTION

Water-soluble polymers of acrylamido sulphonic acids are used for a variety of applications. They are used as flocculants, corrosion and scale inhibitors, and the like. The most commonly available polymers of this type are produced by the homo- or copolymerization of 2 acrylamido-2-methylpropane sulphonic acid (AMPS)[1]. This particular monomer is prepared by reacting sulfonated isobutylene with water and acrylonitrile in accordance with U.S. Pat. No. 3,506,707. This monomer may be then either homo- or copolymerized to produce a variety of water-soluble polymers which, as indicated, have many industrial applications. See, for example, U.S. Pat. Nos. 3,692,673, 3,806,376, and 3,898,037.

[1] Reg. TM Lubrizol Corporation

It would be of benefit to the art if it were possible to produce homo- and copolymers containing acrylamido sulphonic acid groups without necessitating the preparation of an acrylamido sulphonic acid monomer. Expressed in another fashion, it would be of value to the art if acrylamido sulphonic acid polymers could be prepared by a simple modification of existing polymers.

THE INVENTION

The invention comprises a method of preparing copolymers of lower alkyl, aryl and arylalkyl acrylamido sulfonic acids which comprises converting to lower alkyl, aryl and arylalkyl acrylamido sulfonic groups at least 5 mole % of the acrylic acid or methacrylic acid groups in a polymer which contains at least 5 mole % of these monomers in its structures. Specifically, the method comprises reacting an aqueous solution of the acrylic acid or methacrylic acid polymer with an amino lower alkyl, aryl or arylalkyl sulfonic acid under pressure and at a temperature of at least 70° C. for a period of time sufficient to convert at least 5 mole % of the acrylic acid or methacrylic acid groups in the polymer to amido lower alkyl, aryl or arylalkyl sulfonic acid groups.

THE STARTING ACRYLIC ACID OR METHACRYLIC ACID POLYMERS

These polymers are well known and may be prepared by homo- or copolymerizing either acrylic acid or methacrylic acid. When acrylic or methacrylic acids are copolymerized, they may be combined with a variety of comonomers. Illustrations of such comonomers would be acrylamide, methacrylamide, or itaconic acid. The acrylic acid or methacrylic acid polymers may also be combined with small amounts of water-insoluble monomers such as acrylonitrile, styrene, vinyl acetate, and the like. The amount should not be of such magnitude so as to render the polymers water-insoluble.

It is preferred to use as starting polymers the homopolymers of acrylic acid or methacrylic acid. While copolymers containing as little as 5 mole percent of either acrylic or methacrylic acid may be used as a starting material, it is preferred that the copolymers contain between about 20–80% of acrylic acid or methacrylic acid. These starting polymers should be water-soluble or dispersible.

The molecular weight of the starting polymers may vary from as little as 1,000 or 2,000 up to as much as several million. The molecular weight and the degree of conversion to acrylamido lower alkyl, aryl or arylalkyl sulphonic acid polymers will depend primarily upon the intended end use. For example, if dispersancy is required, then polymers having molecular weights less than 100,000 would be used. For flocculation applications, the molecular weight should be as high as possible, e.g. about 500,000 to as much as several million.

While the free acrylic or methacrylic acid forms of the polymers may be used, an equivalent is the utilization of their lower alkyl esters such as the methyl or ethyl acrylates, which esters hydrolyze during the course of the reactions hereafter described.

THE AMINO LOWER ALKYL, ARYL AND ARYLALKYL SULPHONIC ACIDS

These compounds are readily available or can be easily prepared. These are illustrated but not limited to amino methane sulphonic acid, amino ethane sulphonic acid (taurine), amino hexane sulphonic acid, amino isopropyl sulphonic acid, amino dodecyl sulphonic acid, and sulfanilic acid. Common substituents on these molecules may be present, e.g. where the alkyl groups contain substituents such as OH, S, O, and the like, e.g. /-amino-2-hydroxy propane sulfonic and usually the alkyl group will not exceed 12 carbon atoms in chain length.

THE REACTION CONDITIONS

TEMPERATURE

The reaction is conducted at a temperature of at least 70° C., preferably within the range of 100°–220° C., and most preferably within the range of 120°–200° C.

THE REACTION MEDIA AND pH

The reaction is conducted in an aqueous environment and the reactants are used as an aqueous solution thereof. A convenient method of conducting the reaction is to first prepare a solution of the starting polymer which would contain between about 5% up to as much as 50% by weight. The concentration would depend upon the viscosity of the solution, which is dictated by the molecular weight, and the degree of branching of the starting polymer. To this would be added either an aqueous solution of the starting amine or, if the amine is liquid or gaseous, it may be added directly to the polymer solution.

The reaction is conducted in the presence of a water-soluble base such as sodium or potassium hydroxide. The corresponding carbonates can be used. In terms of pH, such may vary over a wide range, e.g. 4–12, although 6–10 is preferable.

PRESSURE

The reaction due to the volatile nature of the solvent at the temperatures of the reaction require the use of a pressurized environment. While it may be simply autogenous, it is preferably within the range of at least 1 and most preferably 5–20 atmospheres of pressure.

The time of the reaction may vary between several hours up to 15 hours although the time of the reaction is controlled by the temperature, pressure, and reactivity of the ingredients.

After the reaction has been completed, the finished product is usually in the form of a solution which may be converted to a solid using known techniques such as evaporation or precipitation.

EXAMPLES

EXAMPLE 1

A solution of polyacrylic acid (15% actives, MW 49,600, 100 g), taurine (7.62 g) and sodium hydroxide (50%, 5.04 g) was charged into a 300 ml Parr reactor and heated to 150° C. for four hours. Analysis of the sample by C13 NMR method showed the polymer contained about 94 mole % carboxylate and 6 mole % sulfoethyl amide.

EXAMPLE 2

A solution of polyacrylic acid (15% actives, MW 43,000, 100 g), taurine (7.62 g), and sodium hydroxide (50%, 5.04 g) was charged into a 300 ml Parr reactor and heated to 175° C. for one hour and 200° C. for three hours. Analysis of the sample by C13 NMR method showed the polymer contained about 95 mole % carboxylate and 5 mole % sulfoethyl amide.

EXAMPLE 3

A solution of polyacrylic acid (15% actives, MW 43,000, 100 g), taurine (15 g), and sodium hydroxide (50%, 10.4 g) was charged into a 300 ml Parr reactor and heated to 150° C. for four hours. Analysis of the sample by C13 NMR method showed the polymer contained about 85 mole % carboxylate and 15 mole % sulfoethyl amide.

EXAMPLE 4

A solution of polyacrylic acid (15% actives, MW 42,800, 177.4 g), taurine (13.6 g), and sodium hydroxide (50%, 9.1 g) was charged into a 300 ml Parr reactor and heated to 150° C. for four hours. Analysis of the sample by C13 NMR method showed the polymer contained 84 mole % carboxylate and 16 mole % sulfoethyl amide.

EXAMPLE 5

A solution of polyacrylic acid (85 mole %)-ethyl acrylate (15 mole %) (26.5% actives, 100 g), taurine (12.5 g), and sodium hydroxide (50%, 8 g) was charged into a 300 ml Parr reactor and heated to 150° C. for three hours. Analysis of the sample by C13 NMR method showed the polymer contained about 9 mole % sulfoethyl amide.

Having thus described our invention, it is claimed:

1. A method of preparing copolymers of acrylamido sulfonic acids which comprises converting to acrylamido sulfonic groups at least 5 mole % of the acrylic acid or methacrylic acid groups in a polymer which contains at least 5 mole % of these monomers in its structure which comprises reacting an aqueous solution of the acrylic acid or methacrylic acid polymer with an amino sulfonic acid from the group consisting of the lower alkyl, aryl and aryalkyl sulfonic acids, under pressure at a temperature of at least 70° C. for a period of time sufficient to convert at least 5 mole % of the acrylic acid or methacrylic acid groups in the polymer to amido lower alkyl, aryl or arylalkyl sulfonic acid groups.

2. The method of claim 1 wherein the acrylic acid or methacrylic acid polymer is a homopolymer and the amino sulphonic acid contains not more than 12 carbon atoms.

3. The method of claim 2 where the amino sulphonic acid is taurine.

4. The method of claim 2 where the amino sulphonic acid is amino-2-hydroxy propane sulfonic acid.

5. The method of claim 2 where the amino sulphonic acid is sulfanilic acid.

* * * * *